(12) United States Patent
Stelmar Netto et al.

(10) Patent No.: US 10,972,532 B2
(45) Date of Patent: *Apr. 6, 2021

(54) DYNAMIC SHARED SERVER RESOURCE ALLOCATION

(71) Applicant: International Business Machines Corporation, Armonk, NY (US)

(72) Inventors: Marco Aurelio Stelmar Netto, Sao Paulo (BR); Sergio Varga, Hortolandia (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,185

(22) Filed: Feb. 1, 2019

(65) Prior Publication Data

US 2019/0166190 A1 May 30, 2019

Related U.S. Application Data

(63) Continuation of application No. 15/270,063, filed on Sep. 20, 2016, now Pat. No. 10,284,636.

(51) Int. Cl.
*H04L 29/08* (2006.01)
*H04L 12/14* (2006.01)
(Continued)

(52) U.S. Cl.
CPC ............ *H04L 67/1002* (2013.01); *G06F 9/46* (2013.01); *G06F 9/4856* (2013.01);
(Continued)

(58) Field of Classification Search
None
See application file for complete search history.

(56) References Cited

U.S. PATENT DOCUMENTS 6,968,323 B1 * 11/2005 Bansal .................. G06Q 10/06
705/80
7,197,433 B2 3/2007 Patel et al.
(Continued)

OTHER PUBLICATIONS

Disclosed Anonymously; "Data Model and Intelligent Engine to Track Virtual Systems and the Associated Physical System and their Location"; IP.com Prior Art Database Technical Disclosure; Electronic Publication Date: Jan. 6, 2012; IPCOM00214056D; pp. 5.
(Continued)

*Primary Examiner* — Younes Naji
(74) *Attorney, Agent, or Firm* — Sonny Z. Zhan

(57) ABSTRACT

A system, method and program product for controlling allocation of user assignments to server systems managed by a shared resource manager of a service provider. User request parameters are received from a first user for identifying a desired server resource. User assignment alternatives are calculated based on migration of user assignments of a second user to make the desired server resource available to the first user. User migration parameters are received from the second user that identify conditions for migrating the current user assignment of the second user from a first server to a second server in accordance with one of the user assignment alternatives. A new configuration of user assignments of the first user and the second user are calculated and communicated to the shared resource manager based on the first user and the second user accepting a user assignment alternative. The server systems are reconfigured in accordance with the new configuration of user assignments.

20 Claims, 5 Drawing Sheets

(51) Int. Cl.
  *G06F 9/46* (2006.01)
  *H04L 12/24* (2006.01)
  *H04L 12/26* (2006.01)
  *H04M 15/00* (2006.01)
  *G06F 9/50* (2006.01)
  *G06F 9/48* (2006.01)
  *G06F 11/34* (2006.01)

(52) U.S. Cl.
  CPC ............ *G06F 9/5027* (2013.01); *G06F 11/34* (2013.01); *H04L 12/1453* (2013.01); *H04L 41/0896* (2013.01); *H04L 41/5003* (2013.01); *H04L 43/08* (2013.01); *H04M 15/8044* (2013.01)

(56) References Cited

U.S. PATENT DOCUMENTS

| | | | |
|---|---|---|---|
| 7,712,100 | B2 | 5/2010 | Fellenstein et al. |
| RE42,726 | E | 9/2011 | Keshav et al. |
| 8,655,610 | B2 | 2/2014 | Dasgupta et al. |
| 8,661,130 | B2 * | 2/2014 | Sonoda ............... H04L 67/1002 709/226 |
| 8,745,241 | B2 | 6/2014 | Waldspurger |
| 9,026,837 | B2 | 5/2015 | Tamhane et al. |
| 9,223,634 | B2 | 12/2015 | Chang et al. |
| 9,313,048 | B2 | 4/2016 | Chang et al. |
| 9,348,840 | B2 | 5/2016 | Sedayao et al. |
| 2004/0051731 | A1 * | 3/2004 | Chang .................... G06Q 40/00 715/734 |
| 2010/0076856 | A1 | 3/2010 | Mullins |
| 2011/0078679 | A1 | 3/2011 | Bozek et al. |
| 2012/0137002 | A1 | 5/2012 | Ferris et al. |
| 2012/0239739 | A1 | 9/2012 | Manglik et al. |
| 2012/0284383 | A1 | 11/2012 | Dudek et al. |
| 2012/0303816 | A1 * | 11/2012 | Kannan .................... G06F 9/50 709/226 |
| 2012/0310765 | A1 | 12/2012 | Masters |
| 2013/0268588 | A1 | 10/2013 | Chang et al. |
| 2013/0304903 | A1 | 11/2013 | Mick et al. |
| 2015/0163285 | A1 | 6/2015 | Chakra et al. |

OTHER PUBLICATIONS

Disclosed Anonymously; "System and method to create profile-aware virtual machine pool in cloud environment"; IP.com Prior Art Database Technical Disclosure; Electronic Publication Date: May 16, 2013; IPCOM000227780D; pp. 13.

Disclosed Anonymously; "A Framework for Data Center Placement Optimization; IP.com Prior Art Database Technical Disclosure"; Electronic Publication Date: Nov. 26, 2016; IPCOM000239697D; pp. 11.

Mell, Peter et al.; "Recommendations of the National Institute of Standards and Technology"; The NIST Definition of Cloud Computing; U.S. Department of Commerce; Special Publication 800-145; Sep. 2011; 7 Pages.

Non-Final Office Action dated Jun. 4, 2018 for U.S. Appl. No. 15/270,063, filed Sep. 20, 2016; pp 31.

Notice of Allowance and Fee(s) Due dated Dec. 26, 2018 for U.S. Appl. No. 15/270,063, filed Sep. 20, 2016; pp. 19.

* cited by examiner

DYNAMIC SHARED SERVER RESOURCE ALLOCATION

TECHNICAL FIELD

The subject matter of this invention relates to allocation of shared server resources, and more particularly to a system for dynamic allocation by users of shared server resources.

BACKGROUND

Cloud computing and other remote computing service models utilize the allocation of various shared servers and similar computing resources to meet customer demands. For example, cloud computing is a model of service delivery for enabling convenient, on-demand network access to a shared pool of configurable computing resources (e.g., networks, network bandwidth, servers, processing, memory, storage, applications, virtual machines, and servers) that can be rapidly provisioned and released with minimal management effort or interaction with a provider of the service. Relevant characteristics of the cloud computing model, may include on-demand self-service, broad network access, resource pooling, rapid elasticity, and measured service (e.g., storage, processing, bandwidth, accounts, etc.). Common service models enabled by cloud computing and other shared models may include software as a service (SaaS), platform as a service (PaaS), and infrastructure as a service (IaaS).

Cloud computing has been an outgrowth of prior models of shared server usage, where the applications, data, and/or other computing resources of multiple users are placed on one or more common servers. In the cloud computing context, IaaS is the capability to provide provisioning of processing, storage, networks, and other fundamental computing resources where the consumer is able to deploy and run arbitrary software, which can include operating systems and applications. In early server sharing arrangements, users may be able to contract for specific computing resources (storage, processing, etc.), server configurations, or even specific servers. Under IaaS, higher levels of abstraction are generally applied to user service requests to improve provider control over efficient use of resources.

Under any server sharing model, there is a tension among the interests of the service provider and multiple users of common resources, such as servers. More specifically, service providers will tend to optimize server allocation for performance and revenue in accordance with the abstractions built into their pricing model. Individual users will generally understand these allocations primarily in terms of performance against specific business criteria (e.g., risk of service interruption, security risk, cost of downtime, etc.) and cost of the resource allocation. Further, different users will have different business criteria and, depending on the uniformity of pricing by the service provider, may have different direct costs of the resource allocation. For example, different users may have critical applications that require processing and/or backup on separate machines, high-performance applications that benefit from colocation and clustering, and geolocation-aware applications that are best located where the highest concentration of end users are. However, to increase efficiency, service providers may not allow users to specify resource placement strategies.

SUMMARY

Aspects of the disclosure provide for controlling allocation of user assignments to server systems, such as server systems managed by a shared resource manager of a service provider. User request parameters are received from a first user for identifying a desired server resource. User assignment alternatives are calculated based on migration of user assignments of a second user to make the desired server resource available to the first user. User migration parameters are received from the second user that identify conditions for migrating the current user assignment of the second user from a first server to a second server in accordance with one of the user assignment alternatives. A new configuration of user assignments of the first user and the second user are calculated and communicated to the shared resource manager based on the first user and the second user accepting a user assignment alternative. The server systems are reconfigured in accordance with the new configuration of user assignments.

A first aspect discloses a system that includes a plurality of server systems interconnected by a network and managed by a shared resource manager of a service provider. The system also includes a resource allocation system controlling allocation of user assignments to the plurality of server systems over the network. The resource allocation system includes a resource request interface, an option calculator, and a migration request interface. The resource request interface receives user request parameters from a first user for identifying a desired server resource. The option calculator calculates a plurality of user assignment alternatives based on migration of user assignments of at least a second user to make the desired server resource available to the first user. The migration request interface receives user migration parameters from at least the second user that identify conditions for migrating a current user assignment of at least the second user from a first server of the plurality of server systems to a second server of the plurality of server systems in accordance with at least one of the plurality of user assignment alternatives generated by the option calculator. The resource allocation system calculates and communicates to the shared resource manager a new configuration of user assignments of the first user and the second user for the plurality of server systems based on the first user and the second user accepting at least one of the plurality of user assignment alternatives. The shared resource manager reconfigures the plurality of server systems in accordance with the new configuration of user assignments.

A second aspect discloses a computer program product stored on a computer readable storage medium, which when executed by a computing system, provides a resource allocation system controlling allocation of user assignments to a plurality of server systems managed by a shared resource manager of a service provider. Program code generates a resource request interface receiving user request parameters from a first user for identifying a desired server resource. Program code generates an option calculator that calculates a plurality of user assignment alternatives based on migration of user assignments of at least a second user to make the desired server resource available to the first user. Program code generates a migration request interface receiving user migration parameters from at least the second user that identify conditions for migrating a current user assignment of at least the second user from a first server of the plurality of server systems to a second server of the plurality of server systems in accordance with at least one of the plurality of user assignment alternatives generated by the option calculator. Program code calculates and communicates to the shared resource manager a new configuration of user assignments of the first user and the second user for the plurality of server systems based on the first user and the second user accepting at least one of the plurality of user assignment alternatives. Program code reconfigures the plurality of server systems in accordance with the new configuration of user assignments.

A third aspect discloses a computerized method for controlling allocation of user assignments to a plurality of server systems managed by a shared resource manager of a service provider. User request parameters are received from a first user for identifying a desired server resource. A plurality of user assignment alternatives are calculated based on migration of user assignments of at least a second user to make the desired server resource available to the first user. User migration parameters are received from at least the second user that identify conditions for migrating a current user assignment of at least the second user from a first server of the plurality of server systems to a second server of the plurality of server systems in accordance with at least one of the plurality of user assignment alternatives. A new configuration of user assignments of the first user and the second user for the plurality of server systems based on the first user and the second user accepting at least one of the plurality of user assignment alternatives are calculated and communicated to the shared resource manager. The plurality of server systems are reconfigured in accordance with the new configuration of user assignments.

BRIEF DESCRIPTION OF THE DRAWINGS

These and other features of this invention will be more readily understood from the following detailed description of the various aspects of the invention taken in conjunction with the accompanying drawings in which.

Figure 1:
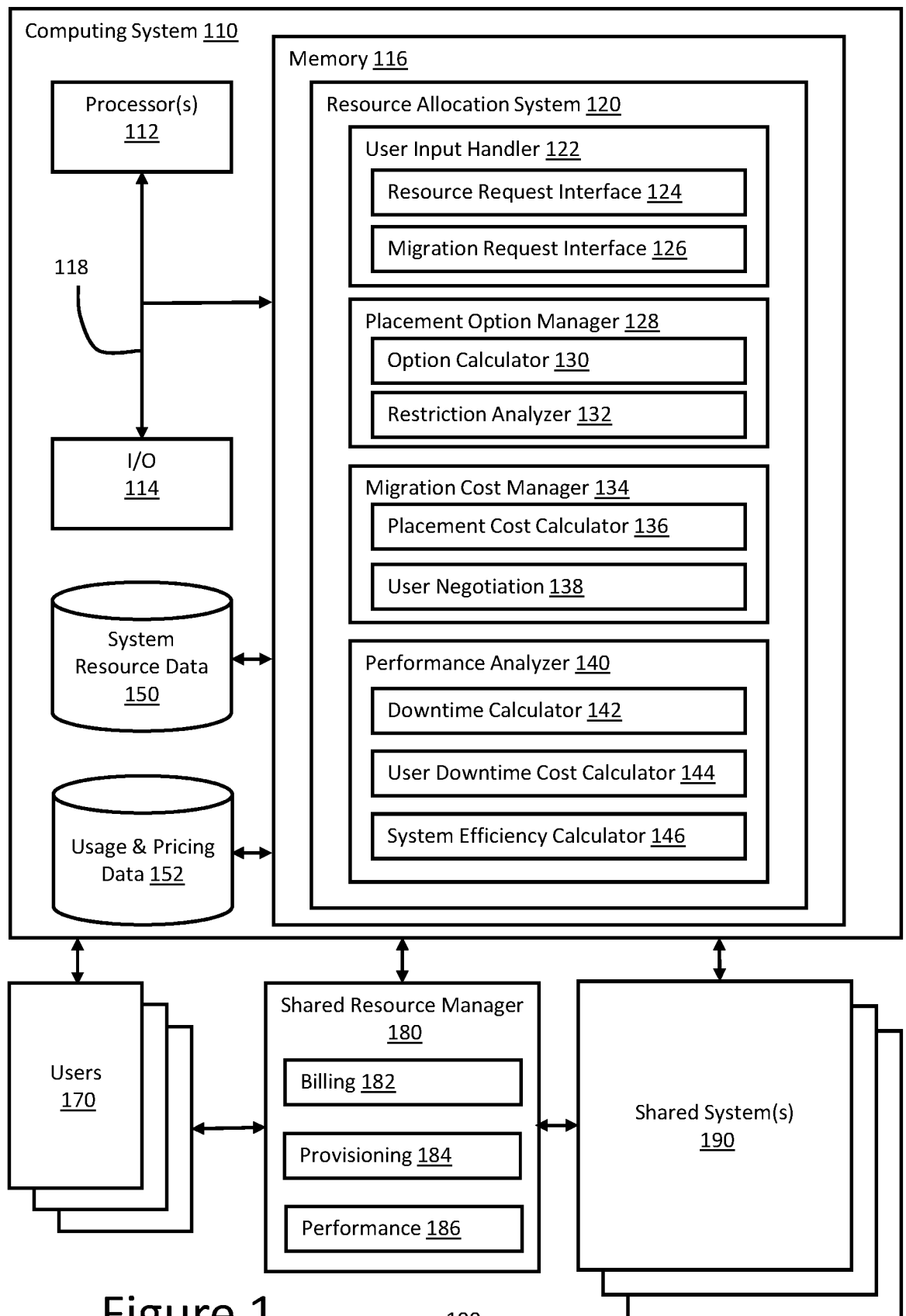
FIG. 1 shows a system for controlling allocation of user assignments to server systems according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a networked system 100 having dynamic shared server resource allocation. Computing system 110 communicates with users 170 and shared resource manager 180 to configure and reconfigure shared systems 190. Users may be exposed to service abstractions and functionality for specifying resource placement strategies and constraints by negotiating with other users for resource placement based on their own cost-benefit analysis of trading placements. By controlling resource abstraction and pricing models, the service provider may still effectively manage the shared resources in accordance with their business model.

Computing system 110 hosts resource allocation system 120. Resource allocation system 120 may provide the data, processes, and related software code to dynamically manage shared server resource allocation among a plurality of users 170. For example resource allocation system 120 may be an application running on computing system 110 for controlling allocation of user assignments to a plurality of server systems over a network. Resource allocation system 120 may include a user input handler 122, a placement option manager 128, a migration cost manager 134, and a performance analyzer 140. Resource allocation system 120 may also access local or shared data repositories, such as system resource data 150 and usage and pricing data 152. User input handler 122 may generate the interfaces between the users 170 and resource allocation system 120. For example, this may include a graphical user interface deployed as a web interface using REST APIs (application program interfaces programmed in accordance with Representational State Transfer architecture and standards), a messaging interface using electronic mail, text, chat, or similar protocols, or a dedicated application for client, mobile, persona computer, or similar computing systems. Placement option manager 128 may generate, evaluate, and manage configuration options and may be primarily focused on the technical capabilities of shared systems 190 and compatibility of user requests at a level of abstraction defined by the service provider operating system 100. For example, placement option manager 128 may calculate a number of configuration options for allocating the shared systems 190 among users 170. Migration cost manager 134 may manage the evaluation of the configuration options in terms of the costs to the impacted users. For example, migration cost manager 134 may calculate the costs to each of users 170 and facilitate dynamic allocation of those costs through a user negotiation process. Performance analyzer 140 may help users determine the business costs of the migration process in order to facilitate better decision-making regarding configuration options. For example, performance analyzer 140 may calculate downtime for reconfiguration of the effected systems in each configuration option, calculate a transaction value per time factor using usage and pricing data 152, and determine a predicted business cost of the transition to the new configuration. Resource allocation system 120 may communicate with shared resource manager 180 to implement the reconfigurations of resource allocations that are selected by users 170. These configuration changes may then be implemented on shared systems 190 using conventional provisioning protocols.

In some embodiments, user input handler 122 may include a resource request interface 124 and a migration request interface 126. Resource request interface 124 may provide users, including a first user initiating a resource allocation change, with a user interface for providing the relevant information to describe the shared computing resource they are looking for. For example, the user may specify various user request parameters for identifying a desired server resource, such allocation specific server resources for hosting one or more user applications. In some embodiments, user request parameters may identify allocation requests, such as specifications for a virtual machine, and allocation constraints, such as physical restrictions relating to the location of the machine meeting the specifications. The exact user request parameters may vary based on the capabilities of shared systems 190 and the selected abstractions and business model of the service provider. In some embodiments, the allocation constraints may include one or more of: server location, co-location with at least one pre-existing server resource, or non-location with at least one pre-existing server resource. Non-location means specifying locations where a server resource will not meet the request, even if it otherwise meets the allocation request. In some embodiments, the cost of the desired server resource may be determined by one or more standard pricing structures of the service provider. In some embodiments, the user may specify flexibility regarding what they are willing to pay for the desired server resource, in some cases above the standard pricing of the service provider. For example, the user may specify a premium amount above the price collected by the service provider that may be used to encourage another user to change their resource allocation to enable allocation of the desired server resource to the requesting user.

Migration request interface 126 may provide users, including a one or more users who could release resources to enable a resource allocation change, with a user interface for responding to a proposed change in configuration related to one or more configuration options. For example, one or more other users may receive notification that another user could use resources currently allocated to them and be provided with a response method for approving a proposed configuration option. Migration request interface 126 may receive user migration parameters from the notified users that identify conditions for migrating a current user assignment of that user from a first server to a second server based on a proposed configuration option. Conditions for migrating could include unconditional acceptance of a proposed configuration option, a counterproposal to vary the specification or costs of the migration for the migrating user, or other conditions. In some embodiments, this process of reaching agreement among users for a proposed change may be iterative in nature, enabling users, including the first user who requested the resource change, to modify their proposed specifications in response to rejections and/or counterproposals from other users. Embodiments may use a variety of methods for achieving agreement through migration request interface 126, including a 2-phase commit protocol. In the event that all proposed configuration options are rejected by other users, the requesting user may be notified that the request has failed and they should reformulate their request. Reformulating the request may include changing the requested specifications, restrictions, and/or premium amount. Consideration of an acceptable configuration option may be based on price, migration costs, and performance. In some embodiments, migration request interface 126 may provide information on price, migration costs, and performance for the configuration options.

In some embodiments, placement option manager 128 may include option calculator 130 and restriction analyzer 132. Option calculator 130 may use the user request parameters to calculate configuration options that include user assignment alternatives. User assignment alternatives are based on migration of user assignments of other users to make the desired server resource available to the requesting user. Option calculator 130 may analyze all resources currently deployed in shared systems 190 that may be compatible with a request. Option calculator 130 may process the requested specifications, including allocation requests and allocation restrictions, to calculate configuration options that are compatible with the request. For example, option calculator 130 may create configuration options using bin-packing algorithms with parameters for selecting or ranking options based on desired characteristics, such as lowest cost, fastest migration, or best performance. These parameters may be defined for the system or may be specified in the user request parameters. Option calculator 130 may identify configuration options that do not require any reconfiguration of existing user resources. In some embodiments, configuration options that require no change in current user allocations may be presented alongside configuration options that do require changes in user allocations such that users may find more efficient configuration options even if not required by a lack of available resources.

Restriction analyzer 132 may identify and analyze restrictions to ensure that no configuration option to be proposed violates any restrictions of the request, such as allocation restrictions. Restriction analyzer 132 may be used by option calculator 30 to eliminate configuration options and user assignment alternatives based on allocation parameters that are incompatible with the desired server resource in the resource request. In addition to the constraints presented in the request, restriction analyzer 130 may also evaluate constraints of other users on the system, including restriction input from users about allocation restrictions for their current resources, and constraints defined by the service provider related to business model, system maintenance, system efficiency, or other considerations.

In some embodiments, migration cost manager 134 may include a placement cost calculator 136 and a user negotiation function 138. Placement cost calculator 136 may calculate costs for each of the users effected by a proposed configuration option. For example, if three users need to be migrated for a proposed configuration option, placement cost calculator 136 will calculate the cost of the resulting user assignment alternatives after the migration based on service provider pricing data, such as usage and pricing data 152. The per user costs may be provided to their respective users through user input handler 122 for use in evaluating configuration options. The costs may be provided to the users prior to their acceptance of a proposed configuration option and resulting user assignments. Placement cost calculator 136 may collect and/or calculate the current costs paid by each user under the current configuration and calculate proposed costs that would be paid under each proposed configuration option.

User negotiation function 138 may enable users to negotiate changes in terms for accepting a proposed user assignment for a proposed configuration option. For example, a user receiving a migration request may specify a certain level of ongoing cost savings or a one-time payment to offset migration costs and such terms may be proposed to the requesting user to enable the proposed configuration option. In some embodiments, user negotiation function 138 may be an option selected by the requesting user to increase the likelihood of being able to secure the desired system resource. User negotiation function 138 enables the requesting user to specify a premium amount through resource request interface 124. The premium amount is a currency amount that the requesting user will pay for the desired server resource over the standard pricing of the service provider such that the premium amount directly benefits the user receiving the migration request. User negotiation function 138 generates a discount amount that will reduce the cost for the user receiving the migration request. The reduced cost may be provided through migration request interface 126 prior to the user accepting a user assignment alternative for a proposed configuration option. In some embodiments, the service provider may also participate in negotiation by offering alternate payment plans, reducing migration costs, and/or contributing to a premium amount (ongoing or one-time) to be paid to the user responding to the migration request.

In some embodiments, performance analyzer 140 may include a downtime calculator 142, a user downtime cost calculator 144, and a system efficiency calculator 146.

Downtime calculator 142 may calculate the downtime between removing a current user assignment for a given user application or virtual machine and provisioning the equivalent user application or virtual machine for a new user assignment to implement a proposed configuration option. In high availability applications, downtime may be a significant cost for users and a relevant consideration for accepting a proposed user assignment. In one embodiment, downtime calculator 142 calculates a predicted downtime for each user assignment alternative and provides the predicted downtime to the user receiving the migration request through migration request interface 126 prior to that user accepting a user assignment alternative for a proposed configuration option.

User downtime cost calculator 144 uses the downtime calculation from downtime calculator 142 to calculate a projected business cost of the downtime based on the specifics of the effected user's application. For example, user downtime cost calculator 144 may calculate a transaction value per time factor based on usage and pricing data 152 that represents an average rate and value of transactions processed by the user's application. The transaction value per time factor can then be multiplied by the predicted downtime to calculate a projected business cost based on the unique characteristics of the user's application and the money it represents. Note that some applications may not lend themselves to direct transaction value and may instead be valued based on risk, availability, or other indirect or non-monetary factors. In one embodiment, user downtime cost calculator 142 calculates the projected business cost for each user assignment alternative and provides the projected business cost to the user receiving the migration request through migration request interface 126 prior to that user accepting a user assignment alternative for a proposed configuration option.

System efficiency calculator 146 may calculate the efficiency of each proposed configuration option for each user assignment alternative involved so that performance may be considered in user evaluation of configuration options. For example, for each proposed configuration option and for each related user assignment, system efficiency calculator 146 may calculate one or more performance metrics for the proposed configuration option. In some embodiments, performance metrics may further be mapped to the critical factors and associated costs for each user's application to provide one or more predicted efficiency metrics for operations under the proposed configuration option. In one embodiment, system efficiency calculator 146 calculates the predicted efficiency metrics for each user assignment alternative and provides the predicted efficiency metrics to the user receiving the migration request through migration request interface 126 prior to that user accepting a user assignment alternative for a proposed configuration option. In some embodiments, system efficiency calculator 146 may also calculate total system efficiency predictions for the service provider and may enable the service provider to monitor, manage, and/or restrict proposed configuration options that do not meet specified efficiency metrics to comply with their business model.

Shared systems 190 may be any shared computer system resource, such as computing resources accessed through shared servers, including physical machines, accelerators, storage arrays, etc. For example, shared systems 190 may include a plurality of server systems connected by a network to shared resource manager 180 operated by a service provider. Shared resource manager 180 may be a conventional shared computer system management application, such as a software platform for controlling hardware and groups of hardware that provide shared processing, storage, and networking resources. In some embodiments, shared resource manager 180 may include an implementation of OpenStack or a similar IaaS management tool. Shared resource manager 180 may include billing 182, provisioning 184, and performance 186 functions for managing the shared systems 190. Billing 182 enables shared resource manager 180 to adjust user billing to reflect new configuration options once they are accepted. Provisioning 184 enables shared resource manager 180 to provision shared systems 190 in accordance with an approved new configuration option. Performance 186 enables shared resource manager 180 to monitor and calculate both performance metrics and resource availability within shared systems 190 and may be used by various components of resource allocation system 120.

Figure 2:
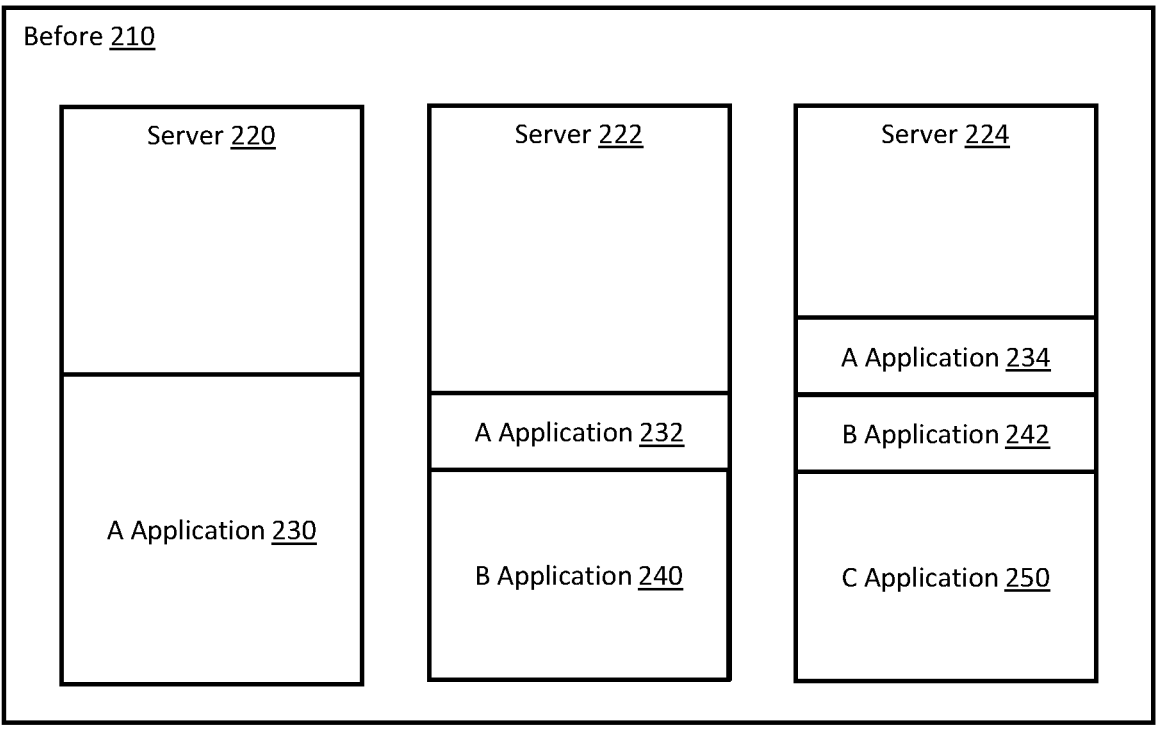
FIG. 2 shows a server configurations before and after reconfiguration according to embodiments.
Figure 2:
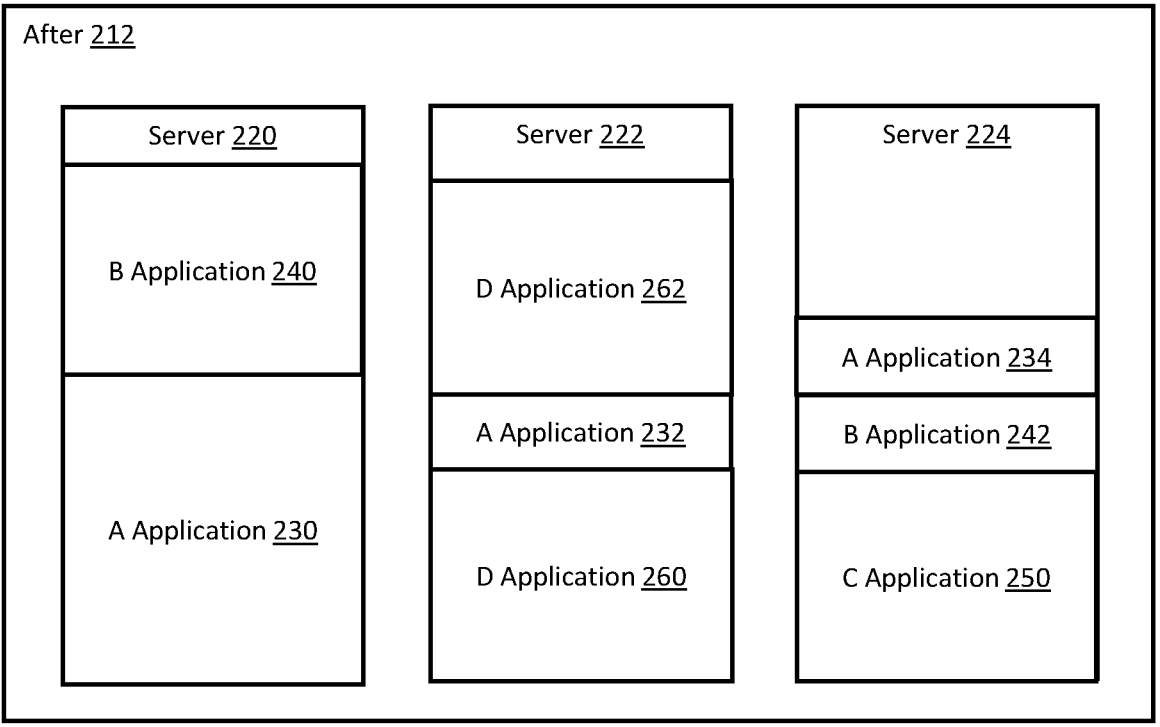

FIG. 2 depicts example server configurations 200 before and after reconfiguration by a resource allocation system, such as resource allocation system 120 in FIG. 1. This is a highly simplified example for explanation purposes only and it will be understood that the number of servers, applications, parameters for allocation, and configuration options may be of any number and complexity depending on the shared systems for which it is deployed. Before configuration 210 shows servers 220, 222, and 224 hosting user applications 230, 232, 234, 240, 242, 250 for three users A, B, and C before a user request for a new resource has been made. User A's application has been provisioned in three application parts, A application 230 on server 220, A application 232 on server 222, and A application 234 on server 224. For example, user A's application may be a web application with performance requirements of 500 requests per minute and transaction value per time factor of $100 per minute, reflecting losses per minute of downtime. 200 requests per minute are running on server 222. User B's application has been provisioned in two application parts, B application 240 on server 222 and B application 242 on server 224. For example, user B's application may be a web application with performance requirements of 50 requests per minute and a transaction value per time factor of $10 per minute. 40 requests per minute are running on server 222 and 10 requests per minute are running on server 224. User C's application has been provisioned in a single application part, C application 250 on server 224. For example, user C's application may be a MapReduce Application with very specific server requirements that require a dedicated server location on server 224.

A user request is received from user D for a high performance computing application that requires significant resources on a single server. In before configuration 210, no one server of servers 220, 222, 224 has sufficient space for hosting user D's application. However, there may be configuration options for hosting all four applications on servers 220, 222, 224 if one or more application parts can be migrated. A resource allocation system identifies three configuration options based on the request parameters and the restrictions of the existing users. In configuration option 1, B application 240 can be moved from server 222 to server 220 to create the necessary space for D application on server 222. In configuration option 2, most of A application 230 can be moved from server 220 to server 222 to create the necessary space for D application on server 220. In configuration option 3, A application 232 and half of B application 240 can be moved from server 222 to server 220 to create the necessary space for D application in server 222. For configuration option 1, user B must consent to a migration request. For configuration option 2, user A must consent to a migration request. For configuration option 3, both user A and user B must consent to the migration request.

For the purposes of this simplified example, we may assume that the operating costs for all users will be the same once the migration is complete, so the migration costs are really the only consideration for approving a plan. We may also assume that all migrations create 1 minute of downtime for the portion of the application being migrated. Because the downtime of user A ($100/minute) is considerable more expensive than the downtime of user B ($10/minute), a migration that involves only user B may be preferable. Even if user D has to pay for downtime plus a premium amount (to reward user B for considering the migration at all) plus a migration fee to the service provider, plan 1 may be worthwhile for user D.

After configuration 212 shows the configuration of servers 220, 222, 224 after configuration option 1 has been accepted by user B and implemented by a shared resource manager. B application 240 and A application 230 are now on server 220. D application 260 and 262 are now on server 222 with A application 232. Server 224 is unchanged with A application 231, B application 242, and C application 250.

Figure 3:
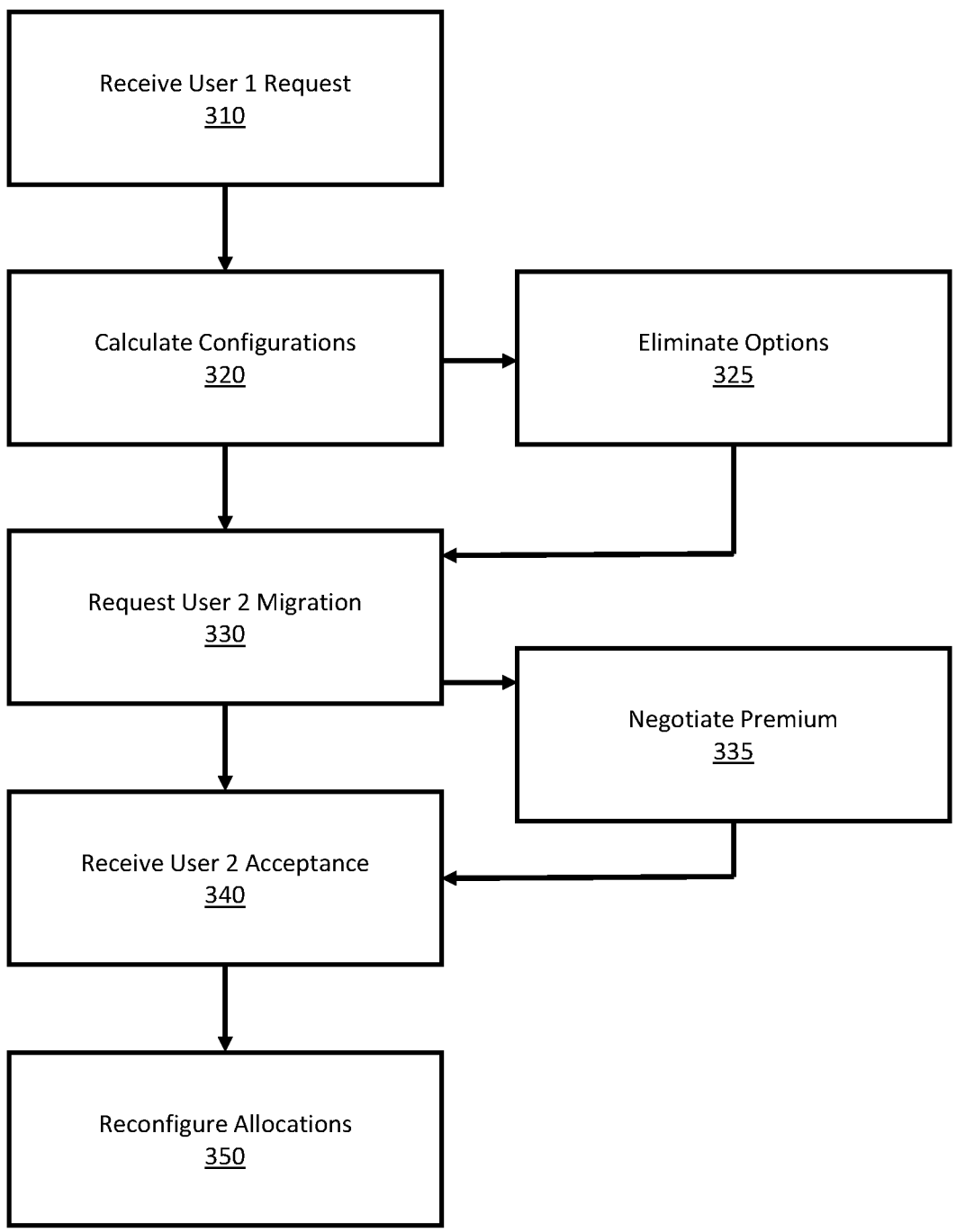
FIG. 3 shows a method of allocating user assignments to server systems according to embodiments.

FIG. 3 depicts a method 300 of allocating user assignments to server systems, such as in accordance with system 100 in FIG. 1. In step 310, a user request for a desired computing resource may be received from a first user. For example, the first user may input a resource request through a user interface with request parameters. In step 320, configuration options may be calculated based on the request parameters and available computing resources. In step 325, configuration options may be eliminated based on request constraints, existing user constraints, and/or system constraints. In step 330, a migration request may be sent to a second user proposing one or more configuration options and proposed user assignments based on those options. In step 335, the first user and the second user, perhaps with some contributions for the service provider managing the system, may negotiate a premium amount that will be paid to the second user if they agree to one of the configuration options. In step 340, acceptance of one of the configuration options may be received from the second user. In step 350, the server systems may be reconfigured according to the user allocations in the accepted configuration option.

It is understood that resource allocation system 120 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 110 that may comprise any type of computing device and for example includes at least one processor 112, memory 116, an input/output (I/O) 114 (e.g., one or more I/O interfaces and/or devices), and a communications pathway 118. In general, processor(s) 112 execute program code which is at least partially fixed in memory 116. While executing program code, processor(s) 112 can process data, which can result in reading and/or writing transformed data from/to memory and/or I/O 114 for further processing. The pathway 118 provides a communications link between each of the components in computing system 110. I/O 114 can comprise one or more human I/O devices, which enable a user to interact with computing system 110. Computing system 110 may also be implemented in a distributed manner such that different components reside in different physical locations.

Furthermore, it is understood that the resource allocation system 118 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

It is understood that although this disclosure includes a detailed description that may be utilized to provide cloud-based computing services, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 4:
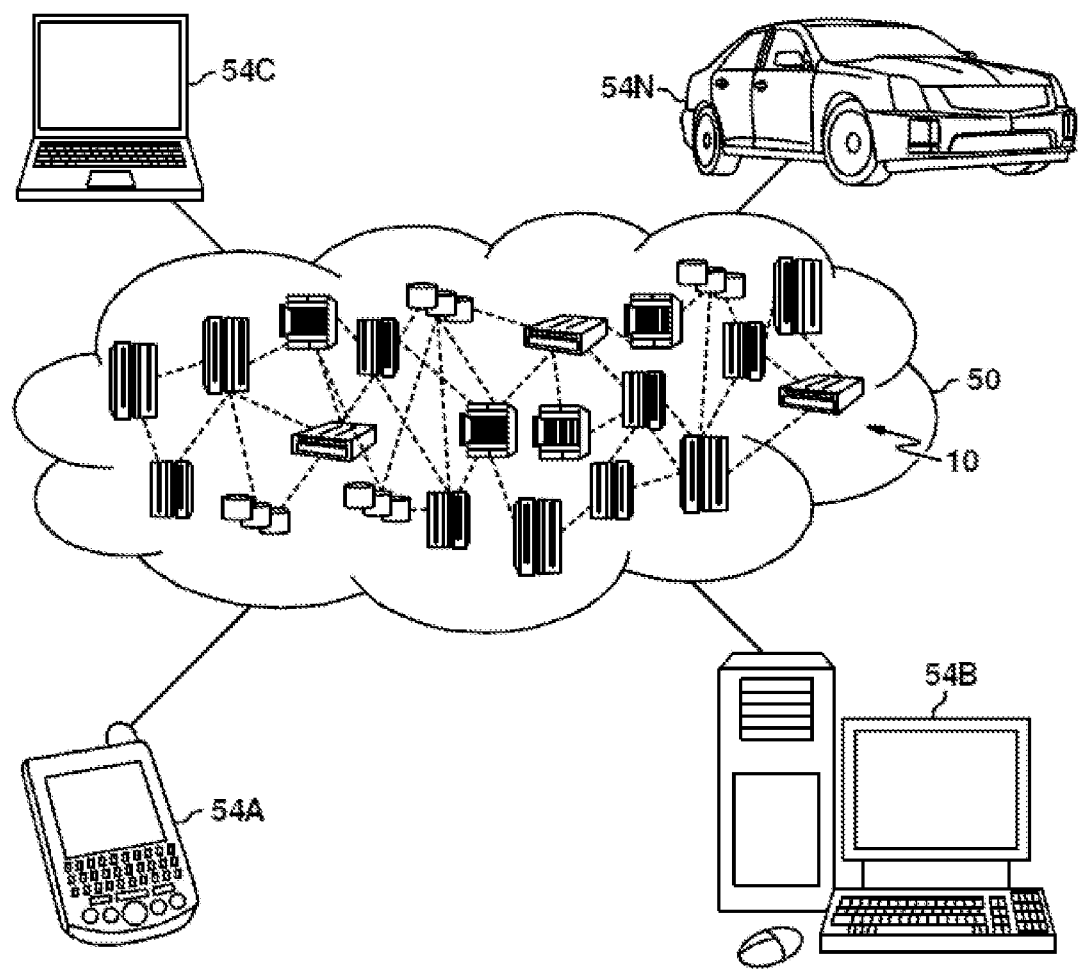
FIG. 4 depicts a cloud computing environment according to embodiments.

A cloud computing environment is service oriented with a focus on statelessness, low coupling, modularity, and semantic interoperability. At the heart of cloud computing is an infrastructure comprising a network of interconnected nodes. Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 5:
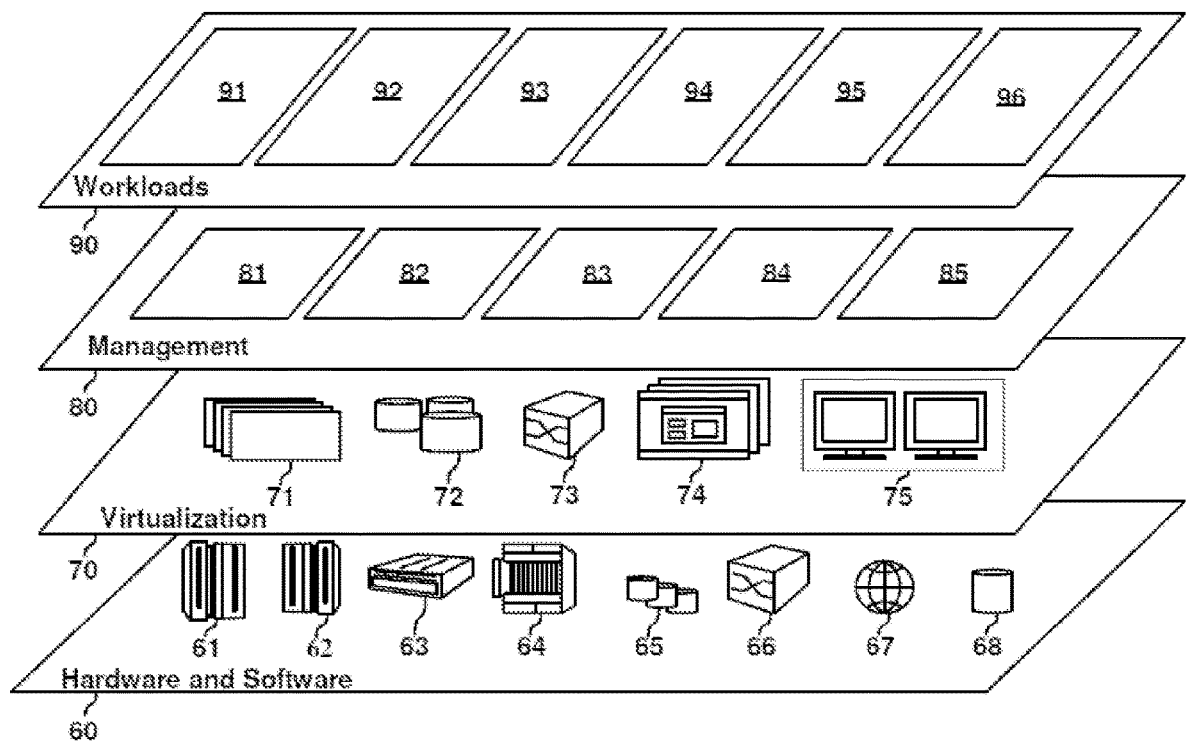
FIG. 5 depicts abstraction model layers according to embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in this case DRaaS.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
  a plurality of server systems interconnected by a network and managed by a shared resource application of a service provider; and
  a resource allocation system controlling allocation of user assignments to the plurality of server systems over the network, the resource allocation system stored in a memory comprising:
    a resource request interface that receives user request parameters from a first user for identifying a desired server resource;
    an option calculator that calculates a plurality of user assignment alternatives based on migration of user assignments of at least a second user to make the desired server resource available to the first user;
    a downtime calculator that calculates a predicted downtime for each of the plurality of user assignment alternatives; and
    a user downtime cost calculator that calculates a predicted business cost for at least the second user based on the predicted downtime and a transaction value per time factor for the second user;
  wherein the resource allocation system provides the predicted downtime and the predicted business cost for at least one of the plurality of user assignment alternatives to at least the second user prior to the second user accepting at least one of the plurality of user assignment alternatives.

2. The system of claim 1, wherein the resource allocation system further comprises:
restriction analyzer that eliminates at least one of the plurality of user assignment alternatives based on at least one restriction input received from at least a third user that is incompatible with the desired server resource.

3. The system of claim 1, wherein the resource allocation system further comprises:
a placement cost calculator that calculates a first user cost and a second user cost for at least one of the plurality of user assignment alternatives based on service provider pricing data for the first user and the second user, wherein the first user cost is provided to the first user and the second user cost is provided to the second user prior to the first user and the second user accepting at least one of the plurality of user assignment alternatives.

4. The system of claim 3, wherein the resource allocation system further comprises:
a user negotiation module that specifies a premium amount through the resource request interface that the first user pays for the desired server resource, whereby the user negotiation module generates a discount amount reducing the second user cost and provides the reduced second user cost to the second user prior to the second user accepting at least one of the plurality of user assignment alternatives.

5. The system of claim 1, wherein the user request parameters from the first user for identifying the desired server resource specify at least one of server location, co-location with at least one pre-existing server resource, or non-location with at least one pre-existing server resource.

6. The system of claim 1, wherein the resource allocation system further comprises:
a migration request interface receiving user migration parameters from at least the second user that identify conditions for migrating a current user assignment of at least the second user from a first server of the plurality of server systems to a second server of the plurality of server systems in accordance with at least one of the plurality of user assignment alternatives generated by the option calculator.

7. The system of claim 6, wherein the migration request interface of the resource allocation system provides the predicted downtime and the predicted business cost for at least one of the plurality of user assignment alternatives.

8. The system of claim 1, wherein the resource allocation system further calculates a new configuration of user assignments of the first user and the second user for the plurality of server systems based on the first user and the second user accepting at least one of the plurality of user assignment alternatives.

9. The system of claim 8, wherein the shared resource application reconfigures the plurality of server systems in accordance with the new configuration of user assignments.

10. A computer program product stored on a non-transitory computer readable storage medium, which when executed by a computing system, provides a resource allocation system controlling allocation of user assignments to a plurality of server systems managed by a shared resource manager of a service provider, the program product comprising:

program code that generates a resource request interface receiving user request parameters from a first user for identifying a desired server resource;
program code that generates an option calculator that calculates a plurality of user assignment alternatives based on migration of user assignments of at least a second user to make the desired server resource available to the first user;
program code that generates a downtime calculator that calculates a predicted downtime for each of the plurality of user assignment alternatives; and
program code that generates a user downtime cost calculator that calculates a predicted business cost for at least the second user based on the predicted downtime and a transaction value per time factor for the second user,
wherein the migration request interface provides the predicted downtime and the predicted business cost for at least one of the plurality of user assignment alternatives to at least the second user prior to the second user accepting at least one of the plurality of user assignment alternatives.

11. The program product of claim 10, further comprising program code that generates a restriction analyzer used by the option calculator to eliminate at least one of the plurality of user assignment alternatives based on at least one restriction input received from at least a third user that is incompatible with the desired server resource.

12. The program product of claim 10, further comprising program code that generates a placement cost calculator that calculates a first user cost and a second user cost for at least one of the plurality of user assignment alternatives based on service provider pricing data for the first user and the second user, wherein the first user cost is provided to the first user and the second user cost is provided to the second user prior to the first user and the second user accepting at least one of the plurality of user assignment alternatives.

13. The program product of claim 12, further comprising program code that generates a user negotiation module that enables the first user to specify a premium amount through the resource request interface that the first user will pay for the desired server resource, whereby the user negotiation option generates a discount amount that will reduce the second user cost and provides the reduced second user cost to the second user prior to the second user accepting at least one of the plurality of user assignment alternatives.

14. The program product of claim 10, wherein the user request parameters from the first user for identifying the desired server resource specify at least one of server location, co-location with at least one pre-existing server resource, or non-location with at least one pre-existing server resource.

15. The program product of claim 10, further comprising:
program code that generates a migration request interface receiving user migration parameters from at least the second user that identify conditions for migrating a current user assignment of at least the second user from a first server of the plurality of server systems to a second server of the plurality of server systems in accordance with at least one of the plurality of user assignment alternatives generated by the option calculator;
program code that calculates and communicates to the shared resource manager a new configuration of user assignments of the first user and the second user for the plurality of server systems based on the first user and the second user accepting at least one of the plurality of user assignment alternatives; and program code that reconfigures the plurality of server systems in accordance with the new configuration of user assignments.

16. A computerized method for controlling allocation of user assignments to a plurality of server systems managed by a shared resource manager of a service provider, comprising:
    receiving user request parameters from a first user for identifying a desired server resource;
    calculating a plurality of user assignment alternatives based on migration of user assignments of at least a second user to make the desired server resource available to the first user;
    calculating a predicted downtime for each of the plurality of user assignment alternatives; calculating a predicted business cost for at least the second user based on the predicted downtime and a transaction value per time factor for the second user; and
    providing the predicted downtime and the predicted business cost for at least one of the plurality of user assignment alternatives to at least the second user prior to the second user accepting at least one of the plurality of user assignment alternatives.

17. The computerized method of claim 16, further comprising eliminating at least one of the plurality of user assignment alternatives based on at least one restriction input received from at least a third user that is incompatible with the desired server resource.

18. The computerized method of claim 16, further comprising calculating a first user cost and a second user cost for at least one of the plurality of user assignment alternatives based on service provider pricing data for the first user and the second user, wherein the first user cost is provided to the first user and the second user cost is provided to the second user prior to the first user and the second user accepting at least one of the plurality of user assignment alternatives.

19. The computerized method of claim 18, further comprising enabling the first user to specify a premium amount through the resource request interface that the first user will pay for the desired server resource, generating a discount amount that will reduce the second user cost, and providing the reduced second user cost to the second user prior to the second user accepting at least one of the plurality of user assignment alternatives.

20. The computerized method of claim 16, further comprising:
    receiving user migration parameters from at least the second user that identify conditions for migrating a current user assignment of at least the second user from a first server of the plurality of server systems to a second server of the plurality of server systems in accordance with at least one of the plurality of user assignment alternatives;
    calculating and communicating to the shared resource manager a new configuration of user assignments of the first user and the second user for the plurality of server systems based on the first user and the second user accepting at least one of the plurality of user assignment alternatives; and
    reconfiguring the plurality of server systems in accordance with the new configuration of user assignments.

* * * * *